No. 860,666. PATENTED JULY 23, 1907.
C. F. ISZARD.
RECORDING SPEED INDICATOR.
APPLICATION FILED APR. 12, 1906.

5 SHEETS—SHEET 1.

Witnesses:
Wilhelm Vogt
Thomas M. Smith

Inventor:
Charles F. Iszard,
By J. Walter Douglass,
Attorney.

No. 860,666. PATENTED JULY 23, 1907.
C. F. ISZARD.
RECORDING SPEED INDICATOR.
APPLICATION FILED APR. 12, 1906.

5 SHEETS—SHEET 2.

Witnesses:
Wilhelm Vogt
Thomas M. Smith

Inventor:
Charles F. Iszard,
By J. Walter Douglass
Attorney

No. 860,666. PATENTED JULY 23, 1907.
C. F. ISZARD.
RECORDING SPEED INDICATOR.
APPLICATION FILED APR. 12, 1906.
5 SHEETS—SHEET 3.
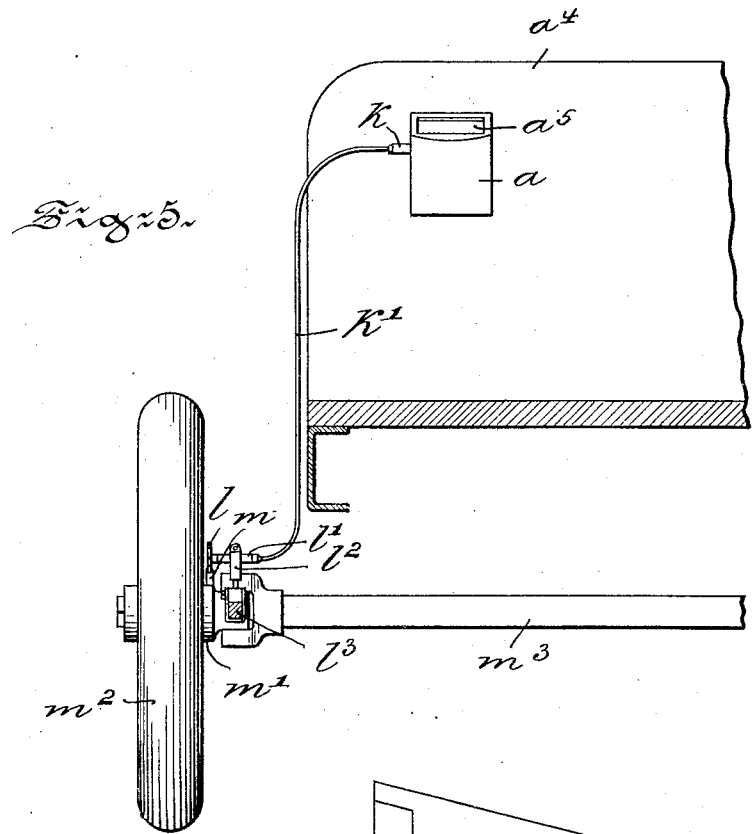
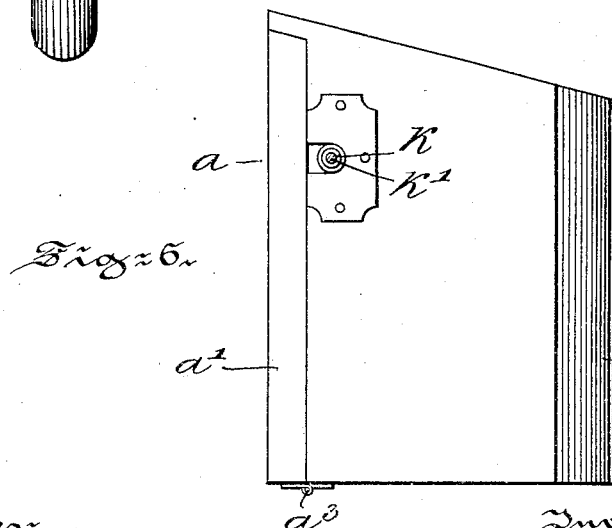
Witnesses:
Wilhelm Vogt
Thomas M. Smith
Inventor:
Charles F. Iszard,
By J. Walter Douglas
Attorney No. 860,666. PATENTED JULY 23, 1907.
C. F. ISZARD.
RECORDING SPEED INDICATOR.
APPLICATION FILED APR. 12, 1906.
5 SHEETS—SHEET 4.
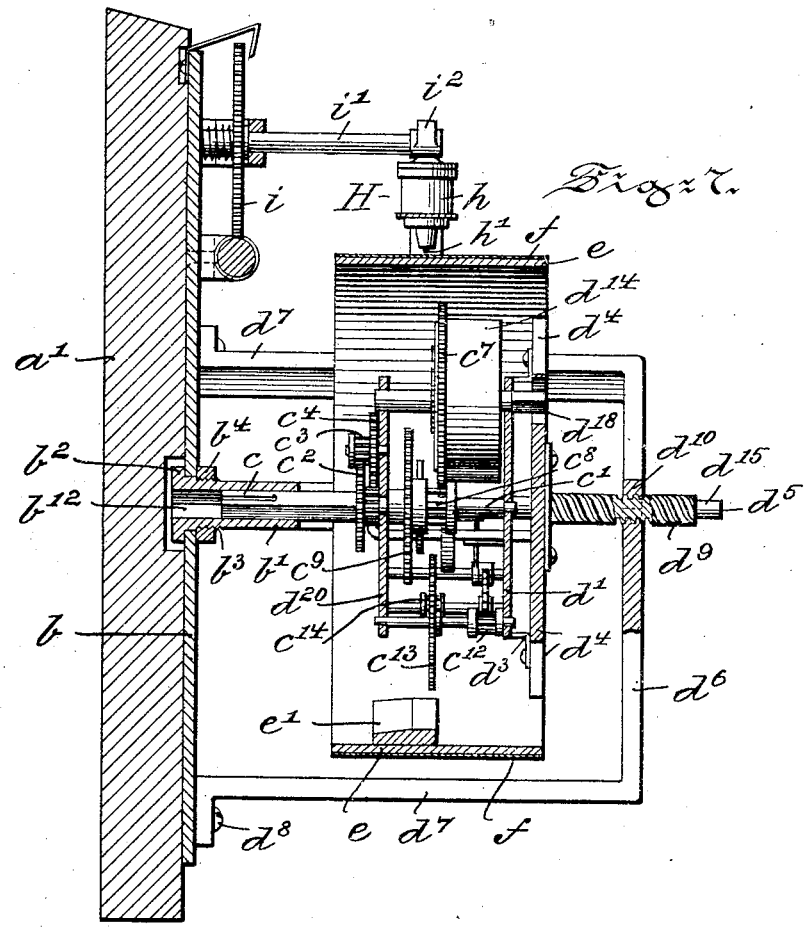
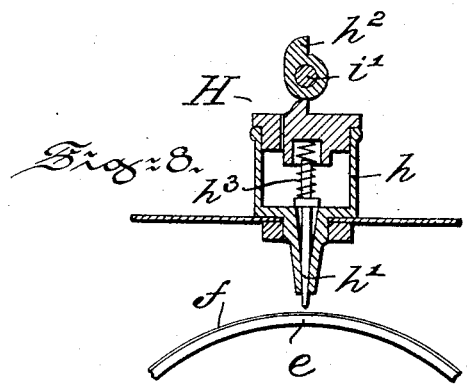

No. 860,666. PATENTED JULY 23, 1907.
C. F. ISZARD.
RECORDING SPEED INDICATOR.
APPLICATION FILED APR. 12, 1906.
5 SHEETS—SHEET 5.
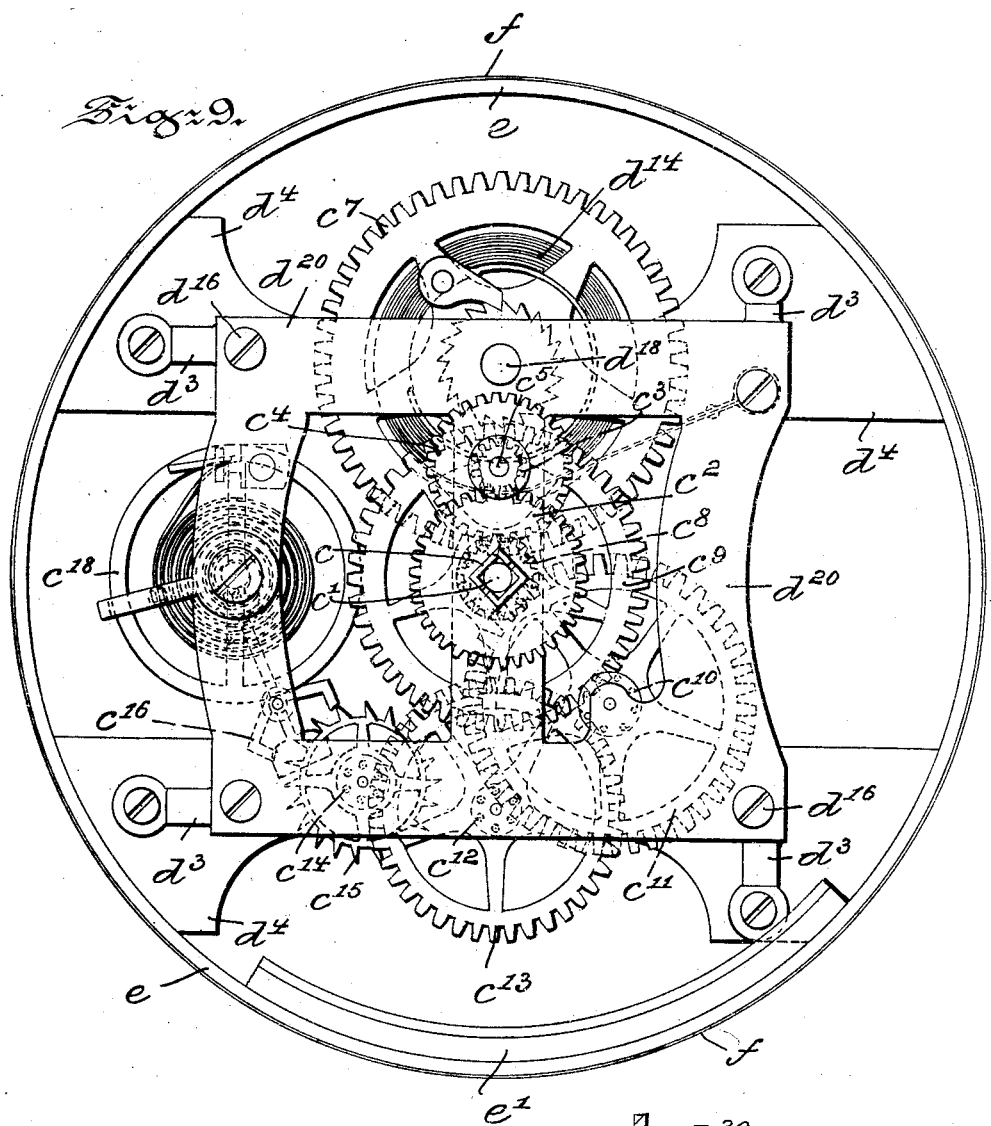
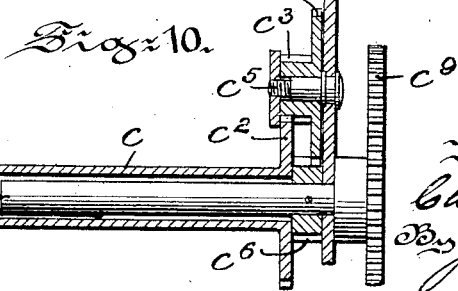

UNITED STATES PATENT OFFICE.

CHARLES F. ISZARD, OF GERMANTOWN, PENNSYLVANIA, ASSIGNOR TO THE SPEEDOGRAPH COMPANY, OF PHILADELPHIA, PENNSYLVANIA, A PARTNERSHIP.

RECORDING SPEED-INDICATOR.

No. 860,666.  Specification of Letters Patent.  Patented July 23, 1907.

Application filed April 12, 1906. Serial No. 311,235.

*To all whom it may concern:*

Be it known that I, CHARLES F. ISZARD, a citizen of the United States, residing at Germantown, in the county of Philadelphia and State of Pennsylvania, have invented certain new and useful Improvements in Recording Speed-Indicators, of which the following is a specification.

My invention has relation to recording speed indicators; and in such connection it relates more particularly to means for actuating the record supporting means.

The principal objects of my invention are first, to provide a support for the reception of a removable record designed to indicate and record the speed of travel of a vehicle and to rotate the record support by a clockwork mechanism with a predetermined speed; second, to provide the recording speed indicator with a support around which the support for the record and actuating clockwork mechanism for the same is rotated; third, to provide the record support with means to shift the same and the clockwork mechanism longitudinally to permit a fixed point on the record support to travel in a spiral path; fourth, to so arrange the supporting means as to prevent further longitudinal movement of the record support, when the same has completed a certain number of revolutions; and fifth, to so arrange a certain other support of the shaft for the record support as to permit of the manual rotation of the record support, and clockwork mechanism and the setting of the record support independent of the clockwork mechanism actuating the same.

Figure 1:
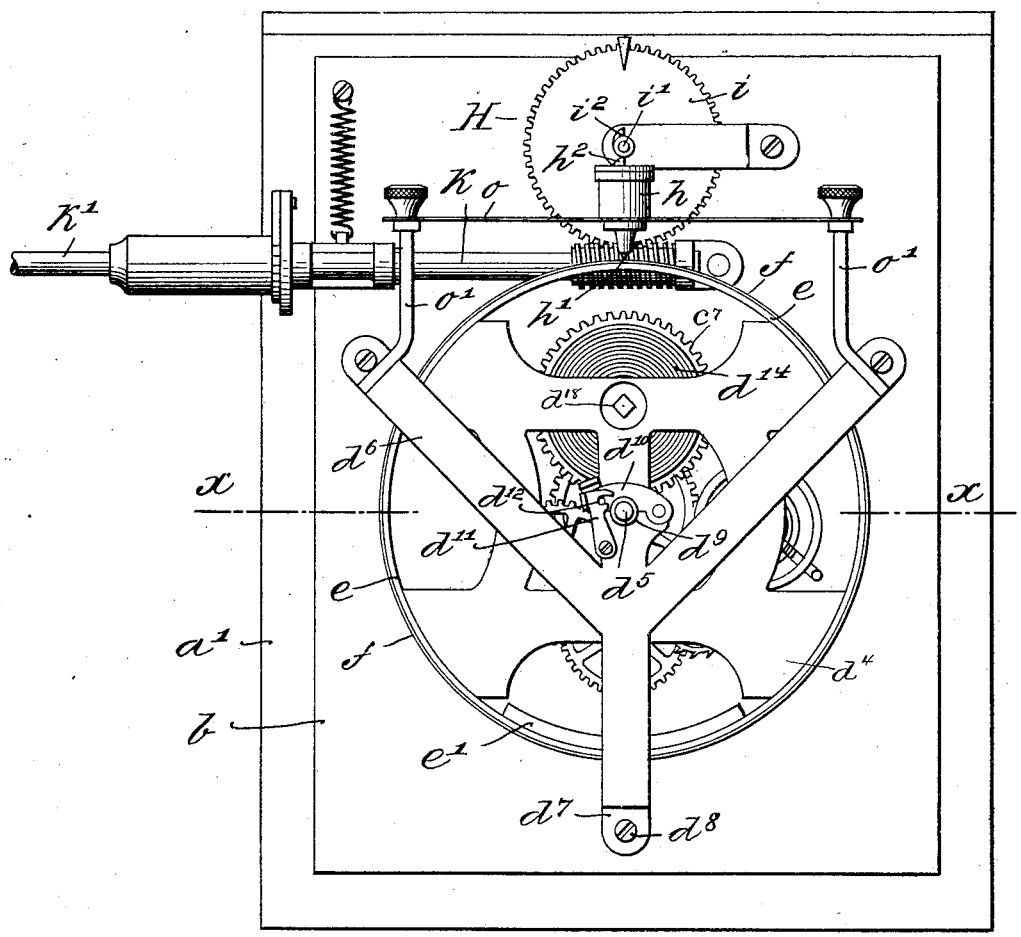
Figure 3:
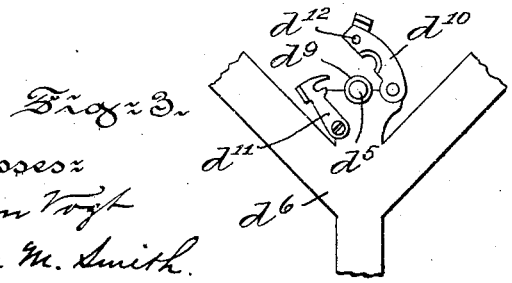
Figure 2:
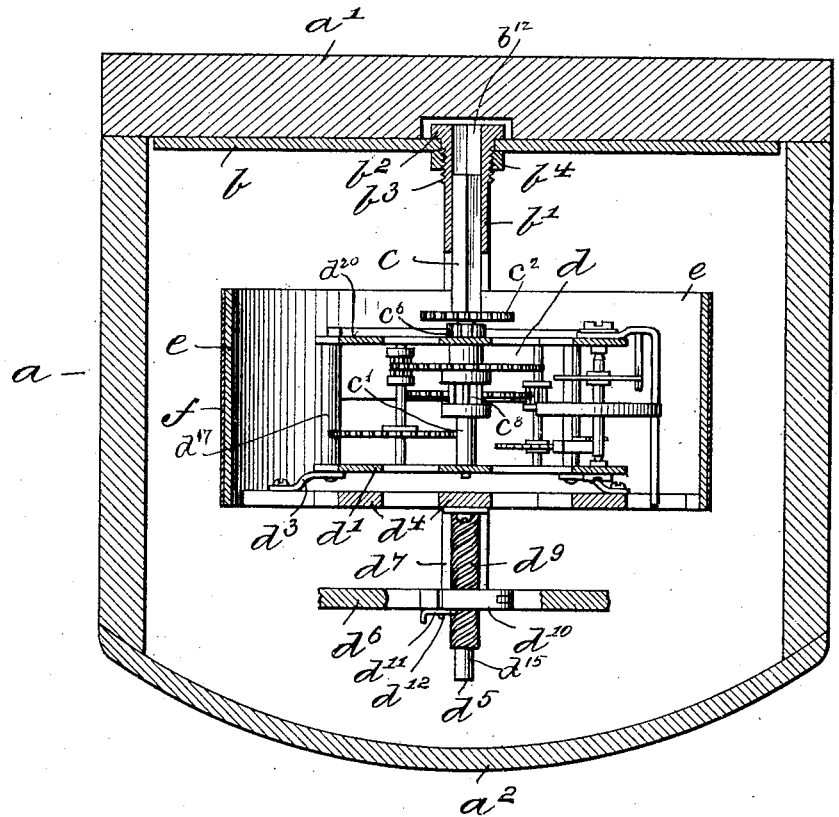
Figure 4:
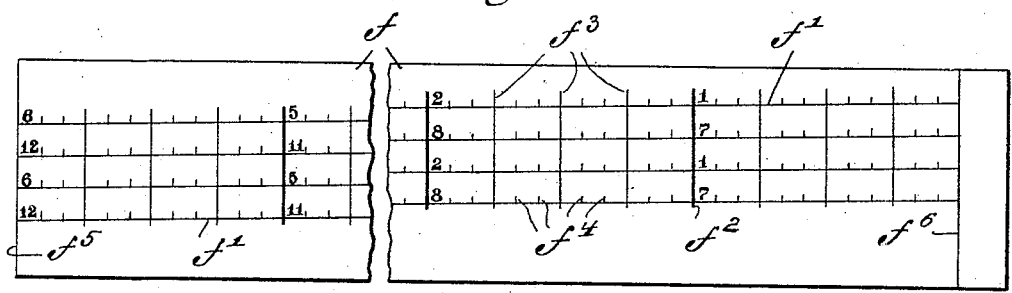

The nature, scope and characteristic features of my invention will be more fully understood from the following description taken in connection with the accompanying drawings forming part hereof, in which Figure 1, is a view, illustrating in side elevation a portion of the housing of the recording speed indicator, a drum forming the support for a record, a clockwork mechanism arranged in the record support rotating with the same a framework for supporting one of the shafts for the record support and a bearing for one of the shafts adapted to permit of a longitudinal shifting of the record support and clockwork mechanism, all embodying main features of my said invention. Fig: 2, is a horizontal sectional view, taken on the line x—x of Fig: 1, illustrating the housing surrounding the recording speed indicator, the record supporting drum, a normally stationary sleeve for supporting the clockwork mechanism and by the same the record supporting drum, a worm-shaft rotated by the record drum adapted to shift the same and the stationary sleeve of the drum longitudinally in the housing, and a friction support for the stationary sleeve adapted to permit of a manual rotating or setting of the record support. Fig: 3, is a detail view, illustrating in side elevation the bearing for the worm-shaft, in an open position. Fig: 4, is a view, illustrating in elevation the record, consisting of a strip of graduated paper removed from the support thereof. Fig: 5, is a view illustrating partly in elevation and partly in section a portion of a vehicle, showing the recording speed indicator secured to the dash-board thereof, and means for transmitting the rotary movement of one of the wheels of the vehicle to the recording speed indicator, to actuate the recording mechanism of the same. Fig: 6, is a detail view enlarged, illustrating in side elevation the recording speed indicator removed from the vehicle. Fig: 7, is a view illustrating partly in central vertical section and partly in elevation, the recording speed indicator. Fig. 8: is a detail view illustrating in section the needle valve for marking the record. Fig. 9: is a detail view, enlarged, illustrating in front elevation the drum, clockwork mechanism and sleeve removed from the supporting frame and housing therefor; and Fig: 10, is a detail view, illustrating partly in section and partly in elevation the sleeve supporting the clockwork mechanism and the drum around which sleeve and clockwork mechanism is rotated.

Referring to the drawings $a$, represents a housing, consisting of the sections $a^1$ and $a^2$, movably secured to each other by a hinge $a^3$, which, when the recording speed indicator is used in conjunction with a vehicle may be secured to the dash-board $a^4$, thereof, and preferably located in a position opposite to the seat of the driver, as shown in Fig: 5. The recording speed indicator proper, consists of a supporting plate $b$, which preferably is secured to the section $a^1$, of the housing $a$. In the support $b$, is arranged a bearing, consisting of a tube $b^1$, provided with a flange $b^2$, and a threaded portion $b^3$, for the reception of a collar $b^4$. The collar $b^4$, by abutting against the plate $b$, serves to force the flange $b^2$, into engagement with the plate $b$, and the friction thus produced between the flange $b^2$, plate $b$, and collar $b^4$, is sufficient to normally prevent the turning of the bearing $b^1$, by a sleeve $c$, slidably arranged therein for a purpose to be presently more fully described. The sleeve $c$, slidably supported at one end in the bearing $b^1$, and at the other end by a shaft $c^1$, carried by the frame $d^{20}$, of the clockwork mechanism $d$, is connected with the same and by the frames $d^{20}$, and $d^1$, united to each other by posts $d^{17}$, and screws $d^{16}$, and by means of arms $d^3$, is connected to a frame $d^4$, which in turn is rigidly secured to a drum $e^1$, thus forming a unitary structure, as shown in Figs: 1, 2, 7 and 9. The frame $d^4$, serves to support a second shaft $d^5$, which at its free end is supported by a tripod-like frame $d^6$, the arms $d^7$, of which, by means of screws $d^8$, are rigidly secured to the plate $b$, as shown in Figs: 1 and 7.

The clockwork mechanism $d$, and drum $e$, are rotated around the sleeve $c$, in the following preferred manner:—As shown in Figs: 7 and 10, the drum $e$, by means of a shaft $c^5$, carried by the frame $d^{20}$, and by a gear-wheel $c^3$, loosely mounted on the shaft $c^5$, and meshing with a gear-wheel $c^2$, of the sleeve $c$, is connected with the same, while the sleeve $c$, by means of a gear-wheel $c^4$, preferably formed integral with the gear-wheel $c^3$, and meshing with a gear-wheel $c^6$, secured to the shaft $c^1$, is in turn connected with the shaft $c^1$. When the shaft $c^1$, is rotated by a clockwork mechanism to be hereinafter more fully described, its rotary movement, by means of the gear-wheels $c^4$ and $c^6$, is transmitted to the gear-wheel $c^3$, which by being rotated revolves around the gear-weeel $c^2$, of the sleeves $c$, which is held stationary by the bearing $b^1$. The gear-wheel $c^3$, will thus rotate the clockwork mechanism $d$, as well as the drum $e$, around the gear-wheel $c^2$, of the sleeve $c$. The drum $e$, may also be readily turned by hand, in which instance, however, the gear-wheel $c^3$, by means of the gear-wheel $c^2$, will turn the sleeve $c$, and bearing $b^1$, in the plate $b$.

In order to rotate the drum $e$, and clockwork mechanism $d$, by the shaft $c^1$, the spring $d^{14}$, of the clockwork mechanism is wound up by turning the shaft $d^{18}$, thereof, which is carried by the frames $d^{20}$ and $d^1$, as shown in Fig. 7. The rapid rotation of the shaft $d^{18}$, and thus the rapid unwinding of the spring $d^{14}$, is prevented in the usual well known manner by a gear-wheel $c^7$, secured to the shaft $d^{18}$, meshing with a pin-wheel $c^8$, secured to the shaft $c^1$, which actuates a gear-wheel $c^9$, meshing with a pin-wheel $c^{10}$, of a gear-wheel $c^{11}$. The gear-wheel $c^{11}$, meshes with a pin-wheel $c^{12}$, of a gear-wheel $c^{13}$, which meshes with a pin-wheel $c^{14}$, of the escapement wheel $c^{15}$, controlled in its movement by the escapement $c^{16}$, actuated by the balance-wheel $c^{18}$, as shown in Figs: 7 and 9. The shaft $c^1$, being thus rotated with a predetermined speed by the pin-wheel $c^8$, by means of the gear-wheel $c^6$, rotates the gear-mechanism hereinbefore described, forming the clockwork mechanism and the drum $e$, connected therewith by the frames $d^{20}$, $d^1$ and $d^4$, around the gear-wheels $c^2$, and thus around the sleeve $c$.

Upon the drum $e$, is mounted the record $f$, preferably, consisting of a strip of graduated paper. The drum $e$, and the record $f$, placed thereon is rotated in a direction from left to right in Figs: 1 and 2, with a speed corresponding to that of the hour pointer of a clock with which speed in the present instance, the drum $e$, will make a complete revolution within six hours. The shaft $d^5$, secured to the frame $d^4$, and assisting in the support of the drum $e$, and clockwork mechanism $d$, is provided with a threaded portion $d^9$, engaging a correspondingly threaded portion of the frame $d^6$, and the threaded portion of an arm $d^{10}$, both forming a bearing supporting the shaft $d^5$. When the shaft $d^5$, is rotated by the frame $d^4$, of the drum $e$, this rotary movement through the intervention of the thread $d^9$, shifts the drum $e$, in a longitudinal direction in the housing $a$, towards the plate $b$. In order to limit this longitudinal movement of the drum or record support $e$, the threaded portion $d^9$, of the shaft $d^5$, terminates in a threadless portion $d^{15}$, which, when the same is brought into engagement with the frame $d^6$, and the arms $d^{10}$, will prevent the further longitudinal movement of the record support or drum $e$, but will not interfere with the rotation thereof. By this longitudinal movement the record support or drum $e$, has been moved for a distance corresponding to about three fourths of its entire width and during this movement has completed four entire revolutions. As the clockwork mechanism $d$, imparts to the record support or drum $e$, a revolution within six hours, it follows that four complete revolutions of the same cover a period of time of twenty four hours, or a day, before the longitudinal movement of the record support or drum $e$, is terminated by the threaded portion $d^9$, of the shaft $d^5$, which termination also prevents the stopping of the rotation of the record support or drum $e$, by preventing its actuating clockwork mechanism $d$, to abut against the bearing $b^1$. During this longitudinal movement of the record support or drum $e$, the preferably rectangular-shaped end of the sleeve $c$, will be further advanced in the bearing $b^1$, which, owing to its similar shaped opening $b^{12}$, effectually prevents rotation of the sleeve $c$, therein. In order to return the record support $e$, to its normal position, the arm $d^{10}$, held in engagement with the frame $d^6$, by a catch $d^{11}$, engaging a bolt $d^{12}$, is lifted permitting the disengagement and sliding of the shaft $d^5$, in the frame $d^6$, until the frame $d^4$, is brought into proximity to the frame $d^6$, after which the shaft $d^5$, is reinserted in the frame $d^6$, and the arm $d^{10}$, brought back into engagement therewith.

As shown in Figs: 1 and 8, above the record support or drum $e$, is arranged a recording device H, which forms the subject matter of a separate application filed by me under date of April 6th, 1906, Serial No. 312,574. This recording device, preferably, consists of a receptacle $h$, for a fluid which is prevented from issuing therefrom by a needle valve $h^1$, normally closing the outlet thereof. This needle valve $h^1$, is forced into the receptacle $h$, against the tension of a spring $h^3$, when the same is brought into engagement with the record $f$, placed on the support or drum $e$, by which movement of the valve $h^1$, a small amount of liquid is permitted to flow by gravity from the receptacle $h$, onto the paper $f$, forming a dot thereon. The receptacle $h$, is brought into engagement with the record $f$, at each complete revolution of a gear-wheel $i$, which is driven by a worm-shaft $k$, actuated by a flexible shaft $k^1$. The shaft $k^1$, is rotated by a gear-wheel $l$, which is actuated by a projection $m$, secured to the hub $m^1$, of the wheel $m^2$, of the vehicle and to the recording speed indicator secured to the dash-board $a^4$, as shown in Fig. 5. The shaft $l^1$, supporting the gear-wheel $l$, by means of a bracket $l^2$, is secured to the lever $l^3$, which is adapted to turn the wheel $m^2$, on its axle $m^3$, when the speed and time indicator is used in connection with an automobile. The wheel $m^2$, at each complete revolution turns the gear-wheel $l$, for the distance of one tooth and the gear wheel $l$, worm-shaft $k$, and gear-wheel $i$, is so proportioned that the gear-wheel $i$, will make a complete revolution at the completion of each mile traveled by the vehicle. This completion of a mile is recorded on the record $f$, by depressing the receptacle $h$, which is accomplished preferably by a cam $i^2$, secured to the shaft $i^1$, of the gear-wheel $i$, engaging a projection $h^2$, arranged on the receptacle $h$. This receptacle in order to permit of a movement of the same in a vertical plane, is supported by a flexible strip of metal $o$, carried by the arms $o^1$, secured to the frame $d^6$, connecting the clockwork mechanism $d$, and record support or drum $e$, to the plate $b$.

As shown in Fig: 4, the strip of paper or record $f$, is divided by obliquely arranged lines $f^1$, into four sections, each representing a complete revolution of the record support or drum $e$, and these sections by heavy vertical lines $f^2$, are divided into six sub-divisions representing six hours. The hours by lines $f^3$ and $f^4$, are again subdivided into quarter hours and in sections of five minutes each. This strip is suitably secured to the support or drum $e$, in which instance the end $f^5$, thereof, will be brought up to the line $f^6$, forming the division line of the record $f$. By this division of the record $f$, each complete revolution of the support or drum $e$, will take place in six hours standard time, and for convenience sake the lines $f^1$, are marked 6 and 12, respectively, at the line $f^6$, indicating twice twelve hours, into which a day is divided to distinguish between day and night. The support or drum $e$, after the record has been secured thereon, will be rotated by hand until the valve $h^1$, has been brought directly above the upper line $f^1$, up to line $f^6$. The clockwork mechanism $d$, may now be actuated by winding up the main spring $d^{14}$, thereof, starting the rotation of the same and of the support or drum $e$, in a direction from left to right in Figs: 1 and 2, and a shifting of the same in a longitudinal direction towards the plate $b$. By these movements the valve $h^1$, of the receptacle $h$, of the recording device H, will be held directly over the lines $f^1$, which, when the strip $f$, is secured to the support or drum $e$, form one contiguous spiral line. In order to record the starting of the vehicle at the exact time of a day, this is accomplished through the intervention of the receptacle $h$, by depressing the same by hand, for which purpose the section $a^2$, of the housing $a$, is opened to permit of access being had to the recording mechanism, after which each mile traveled by the vehicle will be automatically recorded in the matter hereinbefore described. On the other hand, when the clockwork mechanism is at a standstill, the record support or drum $e$, can first be turned by hand to the exact time of starting the vehicle, after which the clockwork mechanism is set in operation to rotate the strip and drum $e$, around the sleeve $c$. Any unauthorized use of the vehicle can also be readily detected by the recording of a use made during the absence of the owner by maintaining the clockwork mechanism and drum in action as in this instance the miles traveled will be indicated on the record $f$, minus the mark indicating the exact time of the starting. By the turning of the support or drum $e$, by hand, the resistance offered by the bearing $b^1$, against the turning of the sleeve $c$, will readily be overcome and the same will again be held by this friction in any given position after the release of the drum or support $e$.

In order to properly balance the record support or drum $e$, the same is provided with a counter-weight $c^1$, which permits of the rotation of the drum and the clockwork mechanism with a uniform speed, which otherwise could not take place as the clockwork mechanism owing to the arrangement of the different parts of the same, tends to overbalance the drum $e$.

Instead of using a record support or drum $e$, of the diameter shown, one of a smaller diameter may be employed, in which instance, however, the record $f$, owing to the greater number of revolutions necessary to be made by the record support or drum $e$, in twenty four hours, must be changed accordingly.

The housing $a$, surrounding the recording speed indicator, is closed at its upper end by a glass-plate $a^5$, through which the support or drum $e$, and the record $f$, secured thereto, as well as the dots made by the recording device H, are readily visible thus enabling the operator at all times to determine the speed of travel of the vehicle in a given time by the number of dots appearing between the hour lines $f^2$, quarter hour lines $f^3$, and minute lines $f^4$, on the line $f^1$, and also indicating the hour of the day that the vehicle is traveling by the numerals of the strip placed adjacent to the hour lines $f^2$, corresponding to the exact hours of the day and by the lines $f^3$ and $f^4$, subdividing the hours. The record $f$, when removed from the support or drum $e$, will thus indicate the distance covered by the vehicle in a given time, the speed which the same traveled and the time at which the traveling took place.

Having thus described the nature and objects of my invention, what I claim as new and desire to secure by Letters Patent is—

1. In a recording speed indicator, a drum, a clock-work mechanism, a frame connecting said mechanism with said drum, a shaft carried by said frame, and actuated by said clock-work mechanism, a sleeve surrounding said shaft and having a gear wheel, means for slidably supporting said sleeve and normally holding in a fixed position, a gear wheel carried by said frame and meshing with the gear-wheel of said sleeve, a second gear wheel mounted on said shaft and meshing with the gear wheel secured to the gear wheel meshing with the sleeve gear wheel, said shaft and gear wheel connected therewith when actuated by said clockwork mechanism adapted to rotate said frame and drum around the gear wheel of said sleeve through the intervention of the gear wheels secured to said frame, substantially as and for the purposes set forth.

2. In a recording speed indicator, a drum, a clock-work mechanism, a frame connecting said mechanism with said drum, a shaft carried by said frame and actuated by said clock-work mechanism, a sleeve surrounding said shaft and having a gear wheel, means for slidably supporting said sleeve and normally holding in a fixed position, a gear wheel carried by said frame and meshing with the gear wheel of said sleeve, a second gear wheel mounted on said shaft and meshing with the gear wheel secured to the gear wheel meshing with the sleeve gear wheel, said shaft and gear wheel connected therewith when actuated by said clock-work mechanism adapted to rotate said frame and drum around the gear wheel of said sleeve through the intervention of the gear wheels secured to said frame, and a worm-shaft secured to said frame and adapted when the frame is rotated to impart to said drum a lateral movement, substantially as and for the purposes set forth.

3. In a recording speed indicator, a drum, a clock-work mechanism, a frame connecting said mechanism with said drum, a shaft carried by said frame and actuated by said clock-work mechanism, a sleeve surrounding said shaft and having a gear-wheel, a bearing supporting said sleeve and normally preventing rotation thereof, a support for said bearing, means for holding said bearing in frictional engagement with said support, a gear wheel carried by said frame and meshing with the gear wheel of said sleeve, a second gear wheel mounted on said shaft and meshing with the gear wheel secured to the gear wheel meshing with the sleeve gear wheel, said shaft and gear wheel connected therewith when actuated by said clockwork mechanism adapted to rotate said frame and drum around the gear wheel of said sleeve through the intervention of the gear wheels secured to said frame and said bearing adapted to permit of the manual rotation of said drum, substantially as and for the purposes set forth.

In witness whereof, I have hereunto set my signature in the presence of two subscribing witnesses.

CHARLES F. ISZARD.

Witnesses:
THOMAS M. SMITH,
J. WALTER DOUGLASS.